United States Patent
Przybylo

(10) Patent No.: US 11,411,718 B2
(45) Date of Patent: Aug. 9, 2022

(54) PARTIAL OVERLAPPING MULTI-KEY ENCRYPTION OF A DATA SET

(71) Applicant: The Boeing Company, Chicago, IL (US)

(72) Inventor: Aleksander Przybylo, Seattle, WA (US)

(73) Assignee: The Boeing Company, Chicago, IL (US)

( * ) Notice: Subject to any disclaimer, the term of this patent is extended or adjusted under 35 U.S.C. 154(b) by 80 days.

(21) Appl. No.: 16/900,095

(22) Filed: Jun. 12, 2020

(65) Prior Publication Data

US 2021/0391986 A1    Dec. 16, 2021

(51) Int. Cl.
*H04L 9/08* (2006.01)
*H04L 9/06* (2006.01)
*H04L 9/14* (2006.01)

(52) U.S. Cl.
CPC .......... *H04L 9/0819* (2013.01); *H04L 9/0643* (2013.01); *H04L 9/0869* (2013.01); *H04L 9/14* (2013.01)

(58) Field of Classification Search
CPC ... H04L 9/0819; H04L 9/0643; H04L 9/0869; H04L 9/14; H04L 9/0894; H04L 63/0428; H04L 9/085
See application file for complete search history.

(56) References Cited

U.S. PATENT DOCUMENTS

| | | | | |
|---|---|---|---|---|
| 7,224,795 B2* | 5/2007 | Takada | | H04L 9/065 380/42 |
| 7,805,442 B1* | 9/2010 | Joshi | | G01C 21/32 707/921 |
| 2005/0157878 A1* | 7/2005 | Matsushita | | H04N 21/26613 348/E7.06 |
| 2010/0211981 A1* | 8/2010 | Shaul | | H04N 19/94 375/240.22 |

(Continued)

FOREIGN PATENT DOCUMENTS

EP    3565174 A1    11/2019

OTHER PUBLICATIONS

Purushothama, B. R., & Amberker, B. B. (2011). Group key management scheme for simultaneous multiple groups with overlapped membership. Third International Conference on Communication Systems and Networks. Bangalore: IEEE. 10 pages.

(Continued)

*Primary Examiner* — Sanchit K Sarker
(74) *Attorney, Agent, or Firm* — Sage Patent Group

(57) ABSTRACT

Methods of providing multi-key encryption of a data set are provided. Operations include providing, to a first data user of the data set, a first user specific data point, providing, to a second data user of the data set, a second user specific data point, and providing, to the first data user and the second data user, at least two shared data points that, when used with either of the first user specific data point or the second user specific data point, define a component polynomial that (Continued)

corresponds to a component that is defined in the data set. Operations further include providing, to the first data user, a first key share point that, in combination with the first user specific data point, defines a first data user polynomial that identifies a first encryption key that is on the first data user polynomial.

20 Claims, 11 Drawing Sheets

(56) References Cited

U.S. PATENT DOCUMENTS

| | | | | |
|---|---|---|---|---|
| 2016/0044001 | A1* | 2/2016 | Pogorelik | G06F 21/44 713/168 |
| 2019/0043341 | A1* | 2/2019 | Wouhaybi | G08B 7/066 |
| 2019/0158270 | A1* | 5/2019 | Berti | H04L 9/3239 |
| 2020/0151356 | A1* | 5/2020 | Rohloff | G06F 21/6227 |
| 2020/0382295 | A1* | 12/2020 | Howells | H04L 9/0866 |
| 2021/0098129 | A1* | 4/2021 | Neumann | G06N 20/00 |
| 2021/0391986 | A1* | 12/2021 | Przybylo | H04L 9/0643 |
| 2022/0058283 | A1* | 2/2022 | Garner | G06F 21/6218 |

OTHER PUBLICATIONS

Shamir, A. (1979). How to share a secret. Communications of the ACM, pp. 612-613.

Verheul, E., Jacobs, B., Meijer, C., Hildebrandt, M., & de Ruiter, J. (2016). Polymorphic Encryption and Pseudonymisation for Personalised Healthcare. Nijmegen, the Netherlands: Institute for Computing and Information Sciences, Radboud University. 38 pages.

European Patent Application No. 21179086.0, Extended European Search Report dated Nov. 3, 2021, 10 pages.

Aarthi, D., et al., "Enabling Efficient and Protected Sharing of Data in Cloud Computing," International Conference on Information Communication and Embedded System (ICICES 2016), 5 pages.

Zheng, Y., et al., "Reusing Shares in Secret Sharing Schemes," The Computer Journal, vol. 37 (1994) No. 3, Oxford, GB (XP000448172), 7 pages.

\* cited by examiner

```xml
1  <?xml version="1.0" encoding="UTF-8"?>
2  <Car Name="Volvo V70R" Owner="Volvo">
3    <Assembly Name="Front Subframe" Quantity="1" Owner="Polestar" Geometry="Front Subframe geometry"?>
4      <Assembly Name="Front Strut" Quantity="2" Geometry="Front Strut geometry">
5        <Part Name ="Strut housing" Quantity="1" Geometry="Strut housing geometry"/>
6        <Part Name ="Upper bearing" Quantity="1" Geometry="Upper bearing geometry" interfaceWith="Chassis"/>
7        <Part Name ="Shock absorber" Quantity="1" Geometry="Shock absorber geometry"/>
8        <Part Name ="Spring" Quantity="1" Geometry="Spring geometry"/>
9      <Assembly Name="Brake caliper" Quantity="1" Owner="Brembo" Geometry="Brake caliper geometry">
10       <Part Name ="Pad wear sensor" Quantity="1" Geometry="Pad wear sensor geometry"/>
11       <Part Name ="Bleeder screw" Quantity="1" Geometry="Bleeder screw geometry"/>
12       <Part Name ="Caliper body" Quantity="1" Geometry="Caliper body geometry" InterfaceWith="Strut housing"/>
13       <Part Name ="Anti-rattle clip" Quantity="1" Geometry="Anti-rattle clip geometry"/>
14     </Assembly>
15   </Assembly>
16   <Part Name ="Stabilizer bar" Quantity="1" Geometry="Stabilizer bar geometry"/>
17   <Part Name ="Bushing" Quantity="4" Geometry="Bushing geometry"/>
18   </Assembly>
19   <Part Name ="Chassis" Quantity="1" Geometry="Chassis geometry"/>
20   <Part Name ="Rear Subframe" Quantity="1" Geometry="Rear Subframe geometry"/>
21 </Car>
```

FIG. 10

$$P_B5 = \{H(S_{PARTA}, X)[N:], H(S_{PARTA}, X)[N:]\}$$
$$P_{BX}'$$
$$P_{BX}''$$

$P_B(X,Y)$

<PART NAME="PARTA"KEYSHARE=[(P_{BX}'),(P_{BX}'')]SALT=S_{PARTA}>

FIG. 11

```xml
 1  <Car AccessPolicy="()" Name="System" Owner="Supplier1">
 2    <Assembly AccessPolicy="[("Supplier 2")"Geometry="4979993fb4e1918df4b7119263lad379e488c47b5d8173e07dad254d0763"
        Keyshare="[(47595, 38575), (5342, 51982.4823426374 2)]" Name="Front Subframe" Owner="Supplier2" Quantity="1">
 3      <Assembly AccessPolicy=[("Supplier 2")"Geometry="0fd38ff09baSed6af2125b4cc3d525681ed8a54c5b558a6ee84f54685b0a2a4d"
        Keyshare="[(47595, 38575), (5342, 51982.4823426374 2)]" Name="Front Strut" Quantity="2">
 4        <Part AccessPolicy=""("Supplier 2", "Supplier 3")
        Geometry="7f381d1a15f310e2bcbcf2aa1119462Sac6d8f1cf74a99cae3d246aee47a21" Keyshare="[(9396, 50163.5660890810l), (734,
        37579.0502786903B)]. "Name="Strut housing" Quantity="1"/>
 5        <Part AccessPolicy=[("Supplier 2")"Geometry = "5557f6dc3be8da7164S703a09l402b443l08ede85be1689d1686S9S964a0bb"
        Keyshare="[(47595, 38575), (5342, 51982.4823426374 2)]" Name="Upper Bearing" Quantity="1" interfacesWith="Chassis"/>
 6        <Part AccessPolicy=[("Supplier 2")"Geometry = "318747d212e2077c33d0c8ea5ff7b681e488c47b5d435d8173e07dad254d0763"
        Keyshare="[(47595, 38575), (5342, 51982.4823426374 2)]" Name="Shock absorber" Quantity="1"/>
 7        <Part AccessPolicy=[("Supplier 2")"Geometry = "8eb9532d5d326627c3le5lf0ab99f2d" KeyShare = "[(47595, 38575), (5342,
        51982.4823426374 2)]" Name ="Spring" Quantity="1"/>
 8      </Assembly>
 9      <Assembly AccessPolicy=[("Supplier 3")"Geometry="ea0a67e56a6038b0504ebb53248692a6f3d563b1426847d83d7ae9d343333208a"
        Keyshare="[(30142, 17574), (13958, 36221.1552820783 25)]" Name="Brake Caliper" Owner="Brembo" Quantity="1">
10        <Part AccessPolicy=[("Supplier 3")"Geometry="ba9b5230fce0738e3435684d30cb55fbdd173db5a6f47afa310966859ed9ecaa"
        Keyshare="[(30142, 17574), (13958, 36221.1552820783 25)]" Name="Pad wear sensor" Quantity="1"/>
11        <Part AccessPolicy=[("Supplier 3")"Geometry="529917Sf9eb579515a337cec34505225f3d563b1426847d83d7ae9d343333208a"
        Keyshare="[(30142, 17574), (13958, 36221.1552820783 25)]" Name="Bleeder screw" Quantity="1"/>
12        <Part AccessPolicy=[("Supplier 3")"Geometry="ad5fca458a8789801 72bc9f2b653fff17dad7e8662f3df06b2044c"
        Keyshare="[(30142, 17574), (13958, 36221.1552820783 25)]" Name="Anti-rattle clip" Quantity="1"/>
13      </Assembly>
14    </Assembly>
15    <Part AccessPolicy=[("Supplier 2")"Geometry="664da5c5ce858737901073347 6b43cb4e488c47b5d435d8173e07dad254d0763"
        Keyshare="[(47595, 38575), (5342, 51982.4823426374 2)]" Name="Stabilizer bar" Quantity="1"/>
16    <Part AccessPolicy=[("Supplier 2")"Geometry="1c7044d1 22223a41f0d507356Sec3Sdf7 8abe10e87c4a7a126c7b5046a48e93c"
        Keyshare="[(47595, 38575), (5342, 51982.4823426374 2)]" Name="Bushing" Quantity="1"/>
17    <Assembly AccessPolicy=[("Supplier 2")"Geometry="5b7aaf4776b2f28c5e3lf59a538588S78ae10e87c4a126c7b5046a48e93c"
        Keyshare="[(47595, 38575), (5342, 51982.4823426374 2)]" Name="Chassis" Quantity="1"/>
18    <Part AccessPolicy="")"Geometry="1222fc9725b69ad658436b4962e318858b99deb00dd00cb2f9c6b2643657ac99" Keyshare="[(27565,
        48338), (35001, 34822)]" Name="Rear Subframe" Quantity="1"/>
20  </Car>
```

FIG. 2

PARTIAL OVERLAPPING MULTI-KEY ENCRYPTION OF A DATA SET

FIELD

The present disclosure relates to encryption of data and, more particularly, to overlapping multi-key encryption of data sets accessible by multiple different parties.

BACKGROUND

A problem in the manufacturing industry of sharing engineering data between the original equipment manufacturer (OEM) acting as integrator and the part suppliers. In some cases, it may be up to the OEM to partition the data and distribute portions of it so that each supplier can access only what they are supposed to access that may be based on many different criteria. For example, one criteria may be based on build responsibility in which the supplier that is responsible for building the part defined in the engineering data should get access to the data. Another criteria may be based on need to know in which the supplier gains access based on the needs to interface with another part that is built by another supplier. Yet another criteria may be based on a licensing issues in which some manufacturing technologies and materials can be subject to export control (this is especially a concern on products under military contracts) and require the supplier to possess appropriate licenses to see.

Any method that partitions the engineering data must be 100% accurate because the OEM is liable for large fines or even cancellations of contracts in case of breaches. Other than in some exception cases (such as the aforementioned interfacing between parts built by two different suppliers), if the OEM sends data to the wrong supplier, he essentially exposes the supplier's intellectual property and can face lawsuits. Similarly, if he exposes data under export control to a supplier outside of the USA, he can face fines from the government or in extreme cases be barred from bidding on government contracts.

For example, in the context of a tree data structure like XML in which each node in the XML tree represents a part (if it is the leaf) or a part assembly (otherwise). An assembly node contains the geometry of the part assembly but not the details on how to fabricate any part that composes it. We also define a relationship "interfacesWith" that creates a dependency between two parts. If partA interfaces with partB, then the owner of partA needs access to partB so that he can design partA in a way that fits with partB (e.g. the holes on partA need to align with holes on partB so that they can be bolted together). In a sense, the presence of the "interfacesWith" relationship, turns this tree structure into a graph structure which could alternatively be described using an RDF file. The list of suppliers that have access to a given part, will be referred to as the "access policy" of the part.

As described above, the complexity of developing and complying with access policies for a data set may be difficult in a multi-party context.

SUMMARY

In accordance with an embodiment, a method for providing multi-key encryption of a data set is provided. Operations include providing, via a processor circuit and to a first data user of the data set, a first user specific data point that is defined in a coordinate system that includes at least two dimensions, providing, via the processor circuit and to a second data user of the data set, a second user specific data point that is defined in the coordinate system and providing, via the processor circuit and to the first data user and the second data user, at least two shared data points that, when used with either of the first user specific data point or the second user specific data point, define a component polynomial that corresponds to a component that is defined in the data set, that is located on the component polynomial and that is accessible to the first data user and the second data user. Operations include providing, via the processor circuit and to the first data user, a first key share point in the coordinate system that, in combination with the first user specific data point, defines a first data user polynomial that identifies a first encryption key that is on the first data user polynomial at an intercept of a first axis in the coordinate system and that is used by the first data user to decrypt contents of a first portion of the data set.

Some embodiments include, providing, via the processor circuit and to the second data user, a second key share point in the coordinate system that, in combination with the second user specific data point, defines a second data user polynomial that identifies a second encryption key that is on the second data user polynomial at an intercept of a first axis in the coordinate system and that is used by the second data user to decrypt contents of a second portion of the data set that is different from the first portion of the data set.

Some embodiments include, before providing the first user specific data point that is defined in a coordinate system that includes at least two dimensions, determining maximum number of data users and determining a degree of the component polynomial.

Some embodiments include generating a plurality of user specific keys that are used to encrypt and decrypt portions of the data set, wherein each of the portions is exclusively accessible to a corresponding one of the plurality of data users.

Some embodiments include distributing the plurality of user specific keys that are used to encrypt and decrypt portions of the data set to respective ones of the plurality of data users.

In some embodiments, distributing the plurality of user specific keys comprises, for each of the plurality of user specific keys, hashing the user specific key based a salt that includes a randomly generated value and including information for extracting the user specific key from a hash value.

In some embodiments, the coordinate system comprises a Galois field and the at least two dimensions are orthogonal to one another.

Some embodiments provide that the first portion of the data set and the second portion of the data set comprise partially overlapping portions that are common to both the first and second portions.

In some embodiments, the first portion includes all of the second portion and other data in the data set.

Some embodiments provide that the data set comprises a manufacturing data set provided by an integrator corresponding to an assembly that includes a plurality of parts, the first portion of the data set comprises first part data corresponding to first part of the plurality of parts, the second portion of the data set comprises second part data corresponding to a second part of the plurality of parts, the first data user comprises a first supplier that supplies the first part to the integrator based on access to the first part data using the first encryption key, the second data user comprises a second supplier that supplies the second part to the integrator based on access to the second part data using the second encryption key.

In some embodiments, the second part data includes data that included in the first part data. Some embodiments provide that the first part data is modified to include additional data after the first supplier receives the first encryption key, wherein the first part data and the additional data are accessible using the first encryption key. In some embodiments, the first data and the second data are mutually exclusive from one another.

Some embodiments provide that the data set includes a single encrypted file, and the first encryption key is used to access a portion of the single encrypted file that corresponds to the first portion of the data set.

Some embodiments herein are directed to methods for providing multi-key encryption of a data set. Operations according to such methods include generating a plurality of encryption keys that are used to decrypt a plurality of portions of the data set that correspond to respective ones of the plurality of encryption keys, generating a plurality of hashed encryption keys from the plurality of encryption keys using at least one randomly generated salt value, and distributing the plurality of hashed encryption keys to respective ones of a plurality of data users, wherein each of the plurality of data users accesses a different one of the plurality of portions of the data set.

In some embodiments, the plurality of encryption keys are persistent relative to changes in corresponding ones of the plurality of portions. Some embodiments provide that generating the plurality of encryption keys comprises generating a plurality of points that are used to define a polynomial in a coordinate system that includes at least two dimensions and determining values of the plurality of encryption keys based on an axis intercept of the polynomial.

In some embodiments, at least one of the plurality of encryption keys provides access to the entire data set. Some embodiments provide that at least one of the plurality of encryption keys provides access to a plurality of portions in the data set.

Some embodiments herein are directed to a system for providing multi-key encryption of a data set. A system includes a processor circuit and a memory circuit associated with the processor circuit. The memory comprising computer readable program instructions that, when executed by the processor circuit cause the processor circuit to perform a set of operations. Operations include providing, to a first data user of the data set, a first user specific data point that is defined in a coordinate system that includes at least two dimensions, providing, to a second data user of the data set, a second user specific data point that is defined in the coordinate system, providing, to the first data user and the second data user, at least two shared data points that, when used with either of the first user specific data point or the second user specific data point, define a component polynomial that corresponds to a component that is defined in the data set, that is located on the component polynomial and that is accessible to the first data user and the second data user and providing, to the first data user, a first key share point in the coordinate system that, in combination with the first user specific data point, defines a first data user polynomial that identifies a first encryption key that is on the first data user polynomial at an intercept of a first axis in the coordinate system and that is used by the first data user to decrypt contents of a first portion of the data set. Operations further include providing, to the second data user, a second key share point in the coordinate system that, in combination with the second user specific data point, defines a second data user polynomial that identifies a second encryption key that is on the second data user polynomial at an intercept of a first axis in the coordinate system and that is used by the second data user to decrypt contents of a second portion of the data set that is different from the first portion of the data set.

In accordance with an embodiment and any of the preceding embodiments, the method and system also include determining if the element is a sub-element of the element and converting the sub-element from the non-text format to the text-based format in response to the sub-element including data in the non-text format. The method and system additionally include writing the sub-element converted to the textbased format to the model text file.

The features, functions, and advantages that have been discussed can be achieved independently in various embodiments or may be combined in yet other embodiments further details of which can be seen with reference to the following description and drawings.

BRIEF DESCRIPTION OF THE DRAWINGS

FIG. 10 is an example of xml coding of a data tree in accordance with some embodiments of the present disclosure.

FIG. 11 is an example of a salting and hashing operation in accordance with some embodiments of the present disclosure.

FIG. 12 is an example of an encrypted xml file that may be used to perform decryption in accordance with some embodiments of the present disclosure.

DETAILED DESCRIPTION

Figure 1:
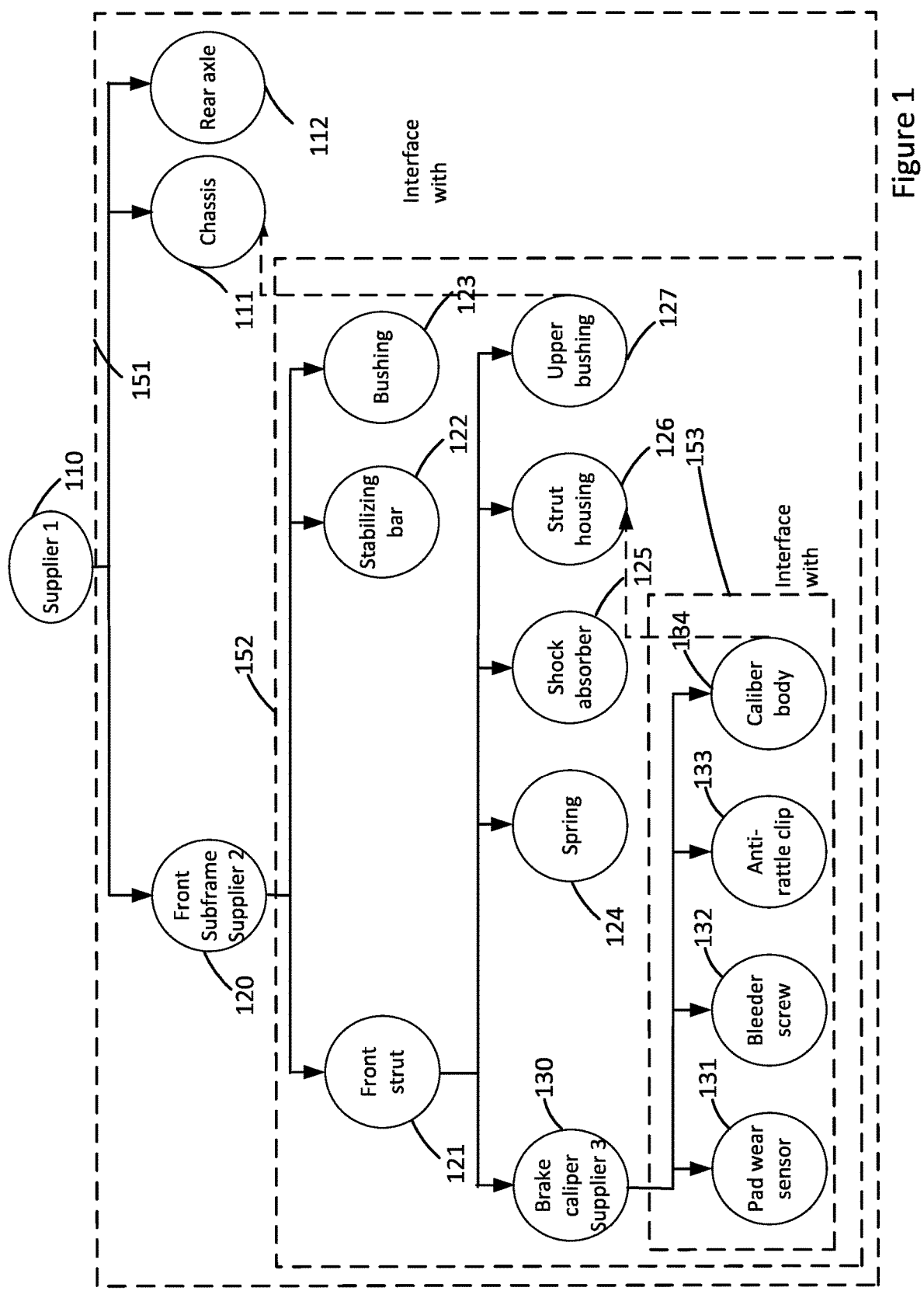
FIG. 1 is a schematic data set diagram illustrating data components and access policies for suppliers and components according to some embodiments.

The following detailed description of embodiments refers to the accompanying drawings, which illustrate specific embodiments of the disclosure. Other embodiments having different structures and operations do not depart from the scope of the present disclosure. Like reference numerals may refer to the same element or component in the different drawings.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuit including, for example, programmable logic circuit, field-programmable gate arrays (FPGA), or programmable logic arrays (PLA) may execute the computer readable program instructions by utilizing state information of the computer readable program instructions to personalize the electronic circuit, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Reference is now made to FIG. 1, which is a schematic data set diagram illustrating data components and access policies for suppliers and components according to some embodiments. As illustrated, in this example, the data set is a bill of materials (BOM) that breaks down a car to be manufactured into major components and that identifies different supplier responsibilities for the different components. For example, the data set may be based on an access policy for each supplier. The first access policy 151 may define that supplier 1 needs access to the entire data set. In this example, the entire structure may include the chassis 111, the rear axle 112 and the front subframe 120.

A second access policy 152 may correspond to components that are accessible to supplier 2 and may correspond to responsibility for the front subframe 120. Components that may be included in the front subframe 120, may include the front strut 121, stabilizing bar 122 and bushing 123. Additionally, the front strut 121 may include the brake caliper 130, spring 124, shock absorber 125, strut housing 126 and upper bushing 127.

Additionally, the second access policy 152 may further provide that supplier 2 is given access to the chassis 111 based on a requirement that the upper bushing 127 interfaces with the chassis 111.

A third access policy 153 may correspond to components that are accessible to supplier 3 and may correspond to responsibility for components in the brake caliper 130.

Components that may be included in the brake caliper 130, may include a pad wear sensor 131, bleeder screw 132, anti-rattle clip 133 and caliper body 134. As such, supplier 3 may be able to access the data corresponding to the third access policy 153. Additionally, the third access policy may further provide that the supplier 3 may be given access to the strut housing 126 based on a requirement that the caliper body 134 interfaces with the strut housing 126.

Thus, supplier 1 may need access to the entire structure (for example so that they can define maintenance manuals). The suspension may be designed by supplier 2 and the braking system may be designed by supplier 3. Note that supplier 3 may not mind sharing their technology with supplier 1 (who is in a different business segment), however, they do not want to share it with supplier 2, who could easily become a competitor. The strut housing 126 ma y need to be accessed by all three of suppliers 1, 2 and 3. An example of xml encoding of this data tree is illustrated in FIG. 10.

The portion of the file that will actually be encoded may be the geometry property on each part tag. In this example, each property value may simply be the part name plus the word "geometry". In some embodiments, the value of this property may be the binary CAD data (such as CATIA, NX or Creo). The rest of the file may carry no proprietary information that needs to be protected. Everyone knows that a car has a front and a real axle and one only needs to look at the brake caliper to see a written identifier corresponding to supplier 3. This might not be the case in some contracts where the supplier relationships can indeed be secret. In such cases, the supplier information may be encrypted the same way as the geometry property.

The following includes some high-level requirements for a solution corresponding to some embodiments herein. Embodiments provide that: the solution needs to support data distribution to all suppliers using a single encrypted file, the size of the file can be larger than the unencrypted file but needs to be independent of the number of suppliers (adding any arbitrarily large number of new suppliers, should not increase the file size); given a supplier key (or set of keys), the supplier can only decrypt: the parts for which he has design or build responsibility, any child of a part for which he has design or build responsibility down to a part for which another supplier is responsible (exclusively), and any part with which he needs to interface; the OEM, can decrypt everything.

Further, a change in access policy to a part, may not require the transfer of any keys between the OEM and the supplier. Note that some embodiments provide that this may be accompanied with a revision to the part geometry and if the ownership of the part changes from supplier 1 to supplier 2, supplier 1 may not be able to decrypt the new revision of the part but can still decrypt the old revision. Similarly, supplier 2 may not be able to decrypt the old revision of the part before he took ownership of it.

In some embodiments, a different key is assigned to each part and the appropriate keys are distributed to each supplier based on the access policy of the part. In such embodiments, the number of keys may become difficult to manage because each new part or revision to a part may necessitate the transfer of a new key to a set of suppliers. Further, the xml file may contain a reference to the key that needs to be used.

In some embodiments, if two parts are meant to be decrypted by the same sets of suppliers, they may be encrypted with the same key. In such embodiments, the number of keys to manage may be smaller.

Some embodiments provide that 1 key per access policy with key sharing may be provided. For example, each supplier may receive a single 2-dimensional point in a Galois Field. One secure key per access policy may be assigned and the data may be encrypted using those keys. Next, a Lagrange polynomial may be computed for the points that belong to each of the suppliers in the access policy plus the point (0,key). Finally, a set of points (of size equal to the number of suppliers in the access policy) is computed on that polynomial (different from the supplier owned points) and those points are shared in the encrypted xml file.

Figure 2:
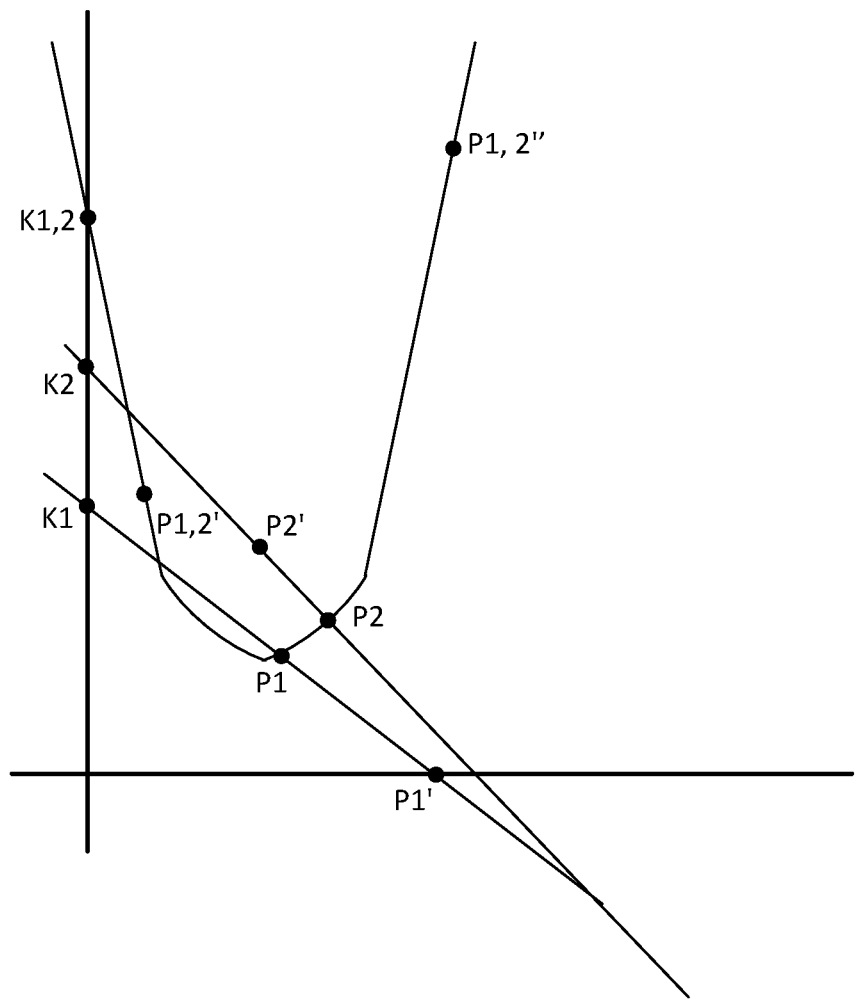
FIG. 2 is a diagram illustrating a two-dimensional coordinate system including plots of data set and component polynomials according to some embodiments.

Although discussed above in the supplier context example, embodiments herein are not so limited. For example, the data set may be a structure and/or unstructured data set including data corresponding to marketing, finance, healthcare, medical, pharmaceutical, and/or communication networks, among others Reference is now made to FIG. 2, which is a diagram illustrating a two-dimensional coordinate system including plots of data set and component polynomials according to some embodiments. Although illustrated as including only two suppliers (Supplier 1 and Supplier 2), embodiments herein are applicable to many more than two suppliers.

$P_1$ and $P_2$ are the points that are given to Supplier 1 and Supplier 2, respectively, at the signing of the contract between Supplier 1 and 2 and the integrator, which may be an Original Equipment Manufacturer (OEM). These points may remain stable for the life of the contract. $K_1$, $k_2$ and $K_{1,2}$ are keys used for encrypting each component corresponding to the data set based on its access policy.

If the component needs to be decrypted by Supplier 1 only, it will be encrypted using $k_1$. If the component needs to be decrypted by both Supplier 1 and Supplier 2, it will be encrypted using $k_{1,2}$ Finally, the encrypted xml file that is distributed further contains the appropriate key-share points for each $P_{x'}$ again based on the access policy.

If the component needs to be decrypted by Supplier 1 only, the key-share will contain $P_{1'}$.

If the component needs to be decrypted by both Supplier 1 and Supplier 2, the key-share will contain $P_{12'}$ and $P_{12''}$.

In the case where Supplier 2 tries to decrypt three different components each encrypted with a different key, if the component has been encrypted using $k_2$, the key-share will contain $P_{2'}$. The Supplier 2 determines the Lagrange polynomial $P_{12}$ for $P_2$ (which only Supplier 2 has) $P_{12'}$ and $P_{12''}$ (which everyone has) and solve it for (x=0) to get $k_2$.

If the component has been encrypted using $k_{1,2}$, the key-share will contain $P_{12'}$ and $P_{12''}$. In this case, Supplier 2 needs to find the Lagrange polynomial $P_{12}$ for $P_2$ (which only Supplier 2 has), $P_{12'}$ and $P_{12''}$ (which everyone has) and solve it for (x=0) to get $k_{1,2}$.

If the component has been encrypted using $k_1$, the key-share will contain $P_{1'}$. In such case, Supplier 2 may attempt to compute the Lagrange polynomial using the points $P_2$ (its secret point), and $P_{1'}$ (which it finds in the key-share in the xml). However, since this will produce a different polynomial from $P_1$, solving it for (x=0) will produce some other key that will fail to decrypt the ciphertext.

In this example of two suppliers, Supplier 2 only knows that Supplier 1's secret point lies somewhere on the polynomial $P_{12}$. If the Galois field is big enough, the number of such points may be too large for Supplier 2 to find it efficiently. This property does not hold though if the number of suppliers is larger than two. For example, in the case of a third supplier, Supplier 3, Supplier 1 and Supplier 2 share two polynomials: one in which Supplier 3 is included and one in which it isn't. All that Supplier 1 or Supplier 2 needs to do is to find the intersections of those two polynomials to find possible candidate for the other supplier's secret point.

In some embodiments, the number of possible suppliers in an access policy may be limited to address this issue. Such embodiments may be limited to certain use cases. For example is the case of two dishonest suppliers that collaborate with one another (two suppliers owned by a single parent corporation or two suppliers owned or controlled by a state actor), all they need to do is share with each other the polynomials they share with another supplier, which they can then intersect and find this third supplier's secret point.

Some embodiments provide that, instead of computing the keys directly from the secret supplier points, adding a salt and translate the point by applying a secure hash function, such as, for example, SHA-512, among others. Then the key can be computed from those translated points. The salt may be computed randomly for each part and included in the xml file. All a supplier needs to do is append the salt, compute the hashes from the concatenations of the salt and the two coordinates, truncate the results and use the newly obtained point and the key-shares following the same method as in the previous sub-section.

An example of a salting and hashing operation is illustrated in FIG. 11.

Given that now a different point is used for each part, intersecting polynomials will not give an attacker any means for decrypting any other part. Using this method any arbitrary amount of suppliers can be included in any access policy without the risk of a dishonest party finding the secret points of other suppliers.

For example, FIG. 12 is an encrypted xml file that may be used to perform decryption by supplier 2.

The xml file shows that the geometry attributes which contain Supplier P are back to their respective plaintexts. All the other geometry attributes are empty. Padding may be implemented by removing x last characters for x equal to the last byte without validating that the pad is actually correct. In this case, the last bytes were larger than the full length of the obtained plaintext.

Figure 3:
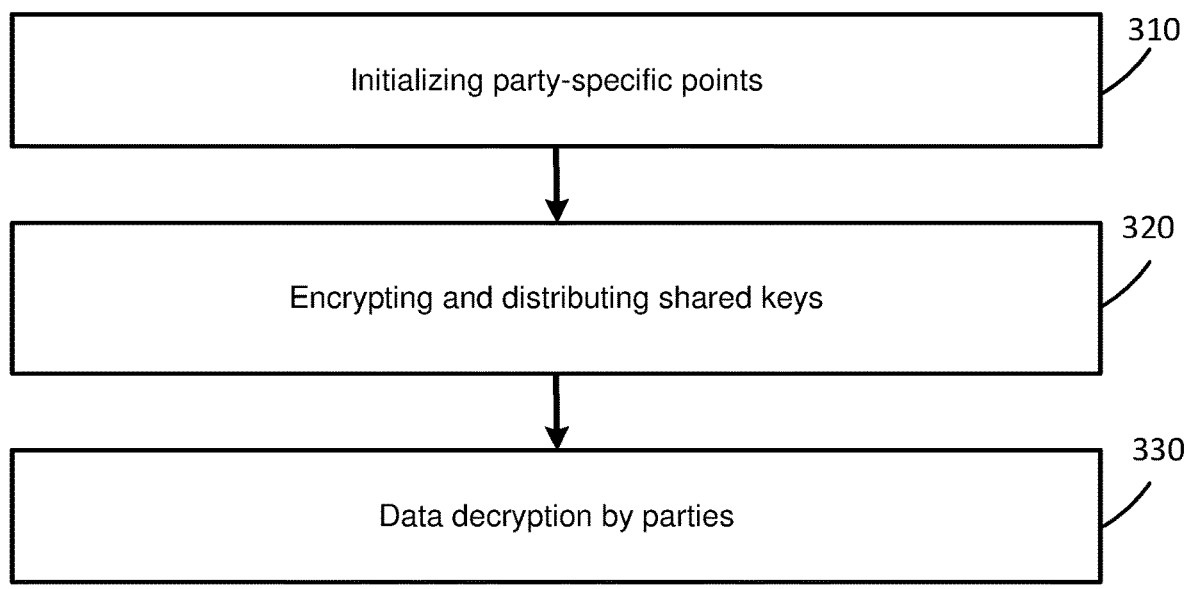
FIG. 3 is a flow chart of an example of a method for partial overlapping multi-key encryption of a data set in accordance with some embodiments of the present disclosure.
Figure 7:
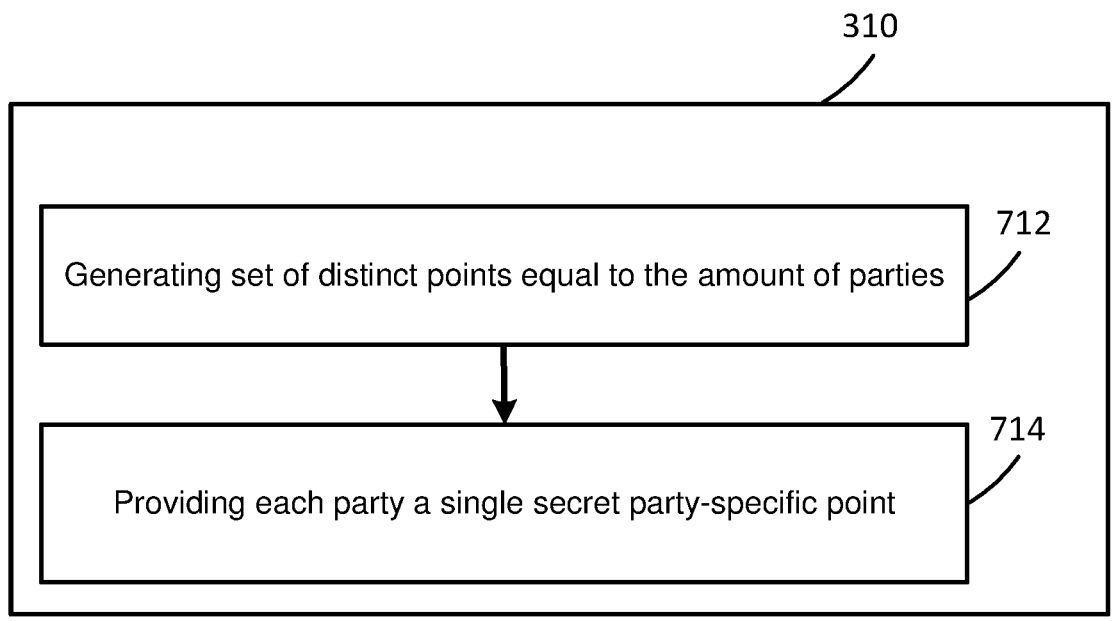
FIG. 7 is a flow chart of an example of operations of the initializing party-specific points of FIG. 3 in accordance with some embodiments of the present disclosure.

Reference is now made to FIG. 3, which is a flow chart of an example of a method for partial overlapping multi-key encryption of a data set in accordance with some embodiments of the present disclosure. Operations include initializing party-specific data points (block 310). Brief reference is made to FIG. 7, which is a flow chart of an example of operations for the initializing party-specific points. Operations include generating (block 712) a set of distinct points based on the number of parties that will be accessing portions of the data set. Each party may be provided with a single secret party-specific point in the coordinate system (block 714).

Figure 8:
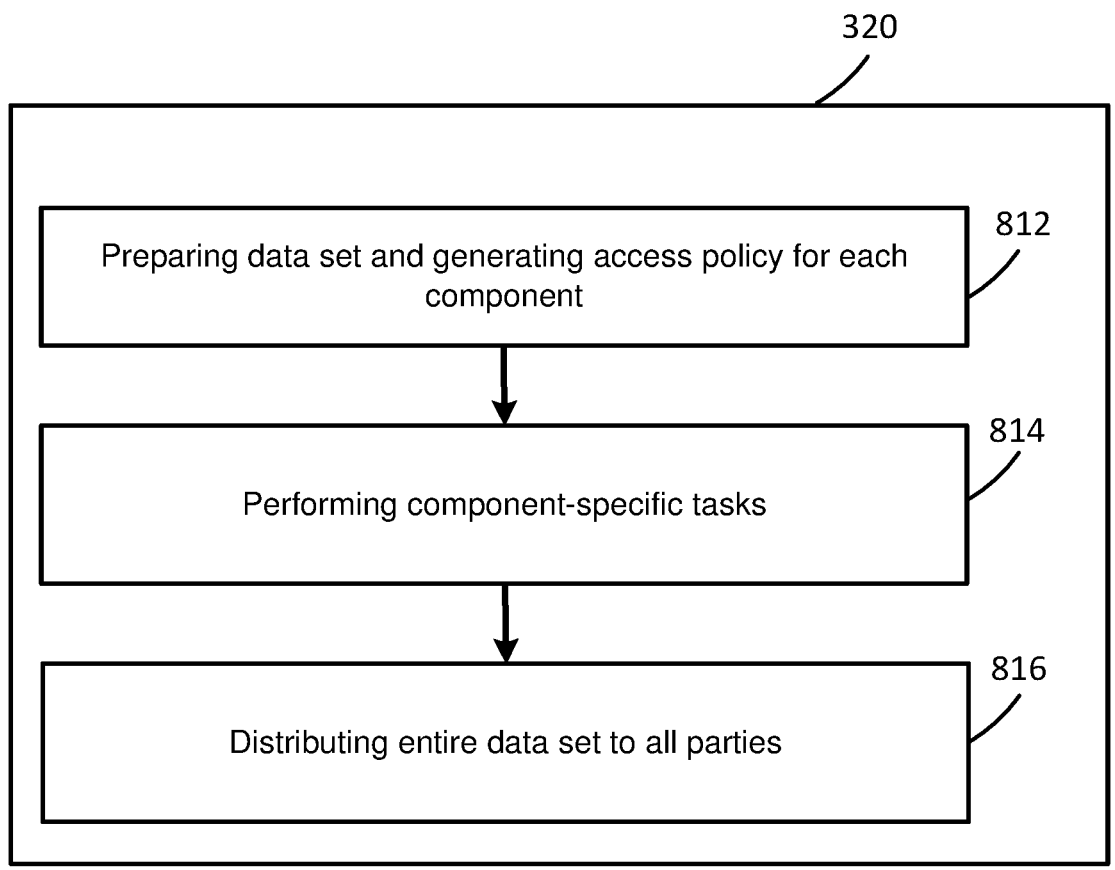
FIG. 8 is a flow chart of an example of operations of encrypting and distributing shared keys of FIG. 3 in accordance with some embodiments of the present disclosure.

Referring back to FIG. 3, some embodiments include encrypting and distributing shared keys (block 320). Brief reference is made to FIG. 8, which is a flow chart of an example of operations of encrypting and distributing shared keys of FIG. 3 in accordance with some embodiments of the present disclosure. Operations include preparing the data set and generating the access policy for each component. The access policy may define the set of parties that need access to each component of the data set.

Operations further include performing a set of component-specific tasks (block 814). Examples of component-specific tasks include generating a random salt value, evaluating the number of parties that need to access the data set. In some embodiments, the degree of the polynomial may be determined as one more that the number of parties that will be accessing the data set. Each party's point may be salted and hashed using the random salt value corresponding to the particular component. Some embodiments provide that the salt may be shared with all parties including those not having access to the given component.

A random point is generated and may be shared with all parties. The random point and the hashed party-specific points may be used to determine a component polynomial and the intersection of the polynomial with the y-axis of the coordinate space may be used to determine the corresponding encryption key.

The encryption key may be used to encrypt the component and all parties may be provided with the encrypted component. The entire data set may be shared with all parties.

Figure 9:
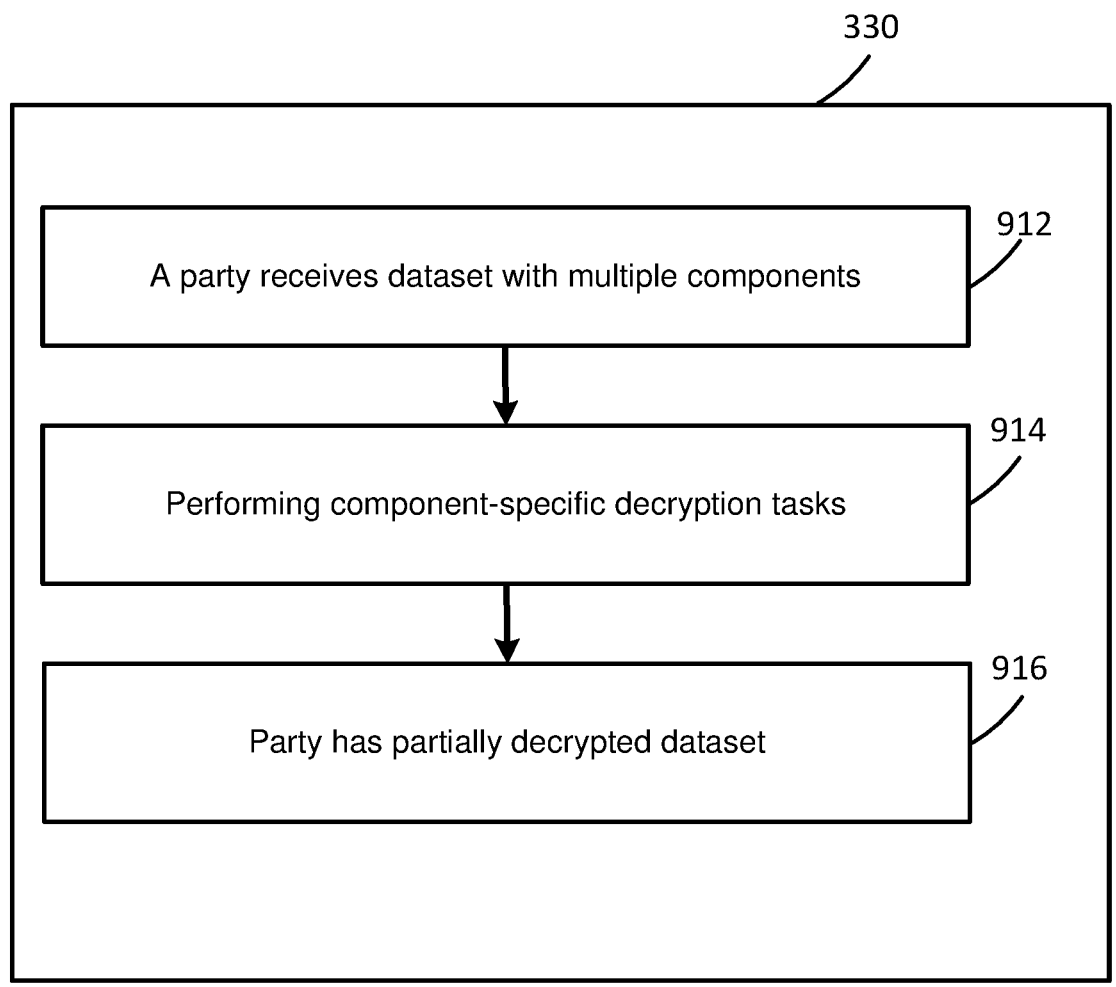
FIG. 9 is a flow chart of an example of operations of data encryption by the parties of FIG. 3 in accordance with some embodiments of the present disclosure.

Referring back to FIG. 3, operations include decrypting the data by the parties (block 330). Brief reference is now made to FIG. 9, which is a flow chart of an example of operations of data encryption by the parties of FIG. 3 in accordance with some embodiments of the present disclosure. Operations include the party receiving the data set having multiple components (block 912). Party-specific decryption operations are performed (block 914). Operations may include salting and hashing the secret point with the public salt value. The hashed secret point is hashed with public points for this component. This may define the polynomial corresponding to the component.

The component polynomial is intersected with the y-axis and the intersection value defines the decryption key. The party decrypts the data using the decryption key. The decryption key will only work on components that the party has access to according to the access policy. The party finishes with a partially decrypted data set.

Figure 4:
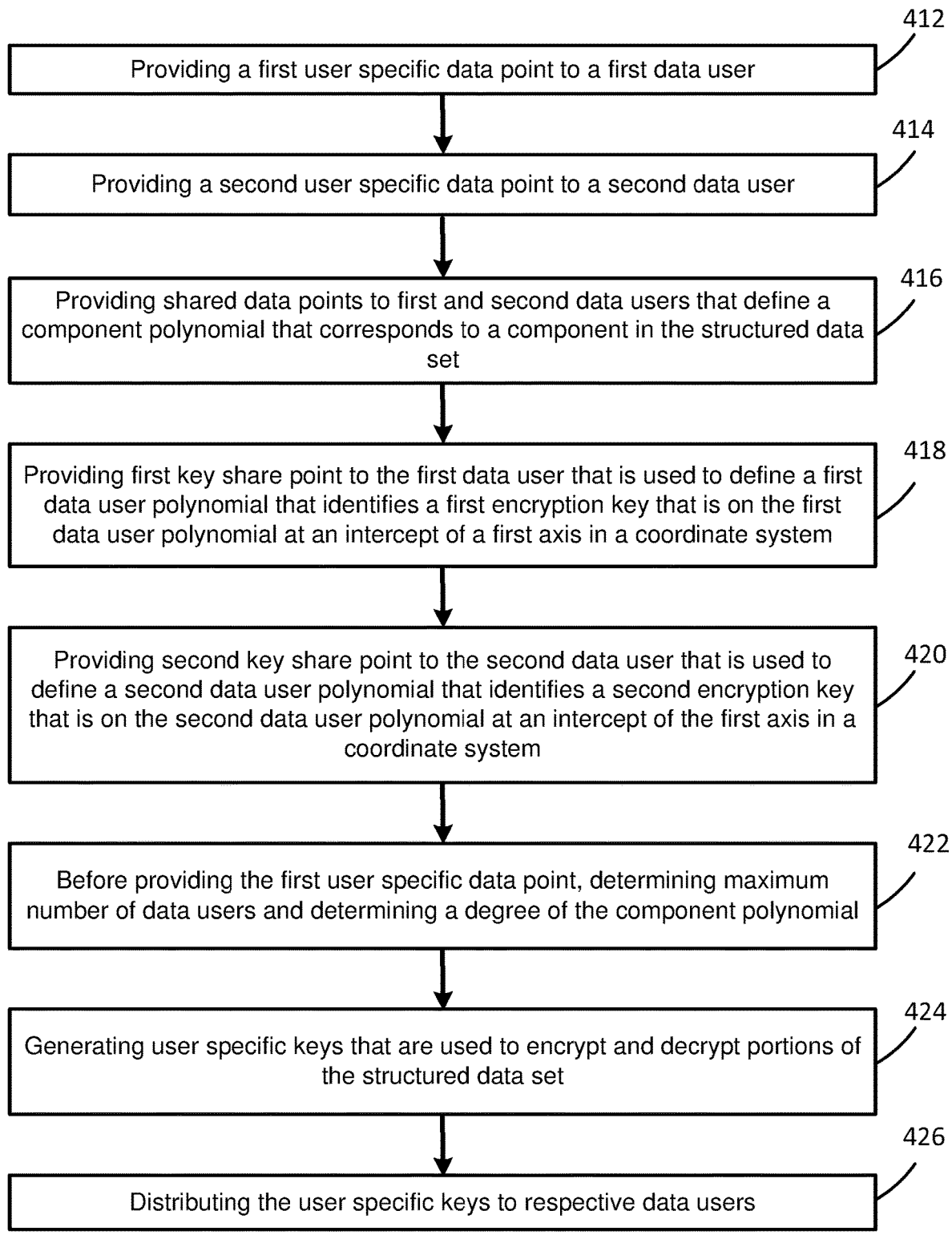
FIG. 4 is a flow chart of an example of a method for partial overlapping multi-key encryption of a data set in accordance with some embodiments of the present disclosure.

Reference is now made to FIG. 4, which is a flow chart of an example of a method for partial overlapping multi-key encryption of a data set in accordance with some embodiments of the present disclosure. Operations include providing (block 412), via a processor circuit and to a first data user of the data set, a first user specific data point that is defined in a coordinate system. In some embodiments, the coordinate system includes two or more dimensions. For example, the coordinate system may be a Galois field including at least two dimensions that are orthogonal to one another.

In some embodiments, the data set is a single encrypted file and the first encryption key is used to access a portion of the single encrypted file that corresponds to the first portion of the data set.

Block 414 includes providing, to a second data user of the data set, a second user specific data point that is defined in the coordinate system. In some embodiments, the first portion of the data set and the second portion of the data set include partially overlapping portions that are common to both the first and second portions.

Some embodiments provide that the first portion includes all of the second portion and other data in the data set.

In some embodiments, the data set includes a manufacturing data set provided by an integrator corresponding to an assembly that includes multiple components/parts. In some embodiments, the first portion of the data set includes first part data corresponding to the first part of the parts and the second portion of the data set includes second part data corresponding to a second part of the parts. In some embodiments, the first data user is a first supplier that supplies the first part to the integrator based on access to the first part data using the first encryption key and the second data user includes a second supplier that supplies the second part to the integrator based on access to the second part data using the second encryption key.

In some embodiments, the second part data includes data that included in the first part data. Some embodiments provide that the first part data is modified to include additional data after the first supplier receives the first encryption key and the first part data and the additional data are accessible using the first encryption key.

In some embodiments, the first data and the second data are mutually exclusive from one another.

Operations may include providing (block 416), to the first data user and the second data user, at least two shared data points. The shared data points may, when used with either of the first user specific data point or the second user specific data point, define a component polynomial that corresponds to a component that is defined in the data set and that is located on the component polynomial and that is accessible to the first data user and the second data user.

Operations may include providing (block 418), to the first data user, a first key share point in the coordinate system that, in combination with the first user specific data point, defines a first data user polynomial that identifies a first encryption key that is on the first data user polynomial at an intercept of a first axis in the coordinate system. In some embodiments, the first encryption key may be used by the first data user to decrypt contents of a first portion of the data set.

In some embodiments, operations include providing (block 420), to the second data user, a second key share point in the coordinate system that, in combination with the second user specific data point, defines a second data user polynomial that identifies a second encryption key that is on the second data user polynomial at an intercept of a first axis in the coordinate system. In some embodiments, the second encryption key may be used by the second data user to decrypt contents of a second portion of the data set that is different from the first portion of the data set.

Some embodiments provide, before providing the first user specific data point that is defined in a coordinate system that includes at least two dimensions, determining (block 422) maximum number of data users and determining a degree of the component polynomial.

Some embodiments include generating (block 424) multiple user specific keys that are used to encrypt and decrypt portions of the data set. In some embodiments, each of the portions is exclusively accessible to a corresponding one of the data users.

Some embodiments include distributing (block 426) the plurality of user specific keys that are used to encrypt and decrypt portions of the data set to respective ones of the data users. Some embodiments provide that distributing the user specific keys includes, for each of the user specific keys, hashing the user specific key based on a salt that includes a randomly generated value and including information for extracting the user specific key from a hash value.

Figure 5:
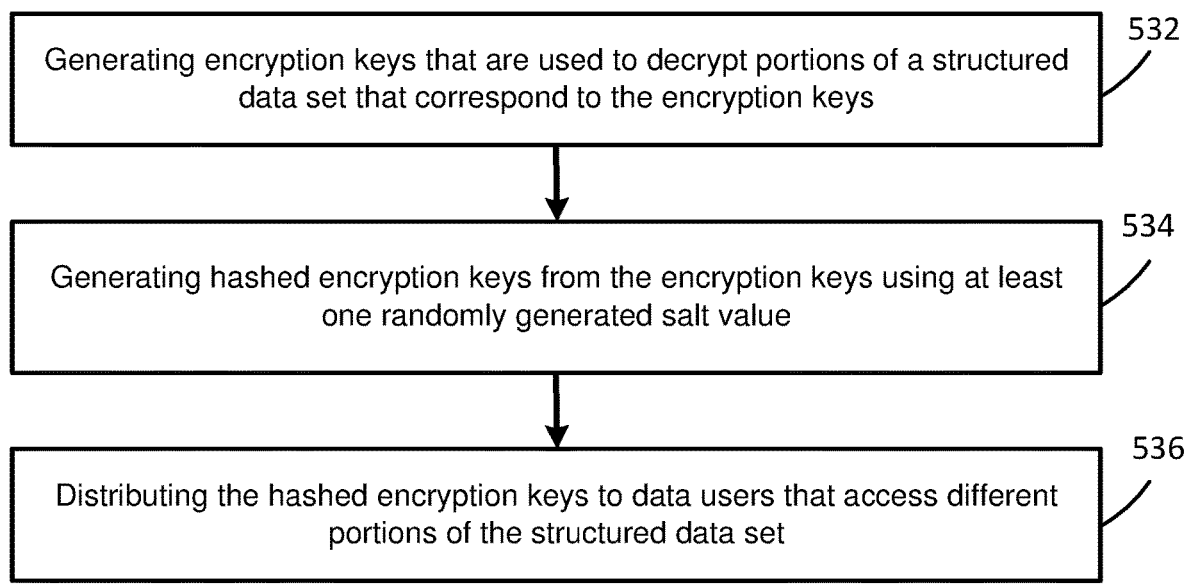
FIG. 5 is a flow chart of an example of a method for partial overlapping multi-key encryption of a data set in accordance with some embodiments of the present disclosure.

Reference is now made to FIG. 5, which is a flow chart of an example of a method for partial overlapping multi-key encryption of a data set in accordance with some embodiments of the present disclosure. Operations include generating (block 532) multiple encryption keys that are used to decrypt multiple portions of the data set that correspond to respective ones of the encryption keys.

In some embodiments, the encryption keys are persistent relative to changes in corresponding ones of the portions of the data set.

Some embodiments provide that generating the encryption keys includes generating multiple points that are used to define a polynomial in a coordinate system that includes at least two dimensions and determining values of the encryption keys based on an axis intercept of the polynomial.

In some embodiments, at least one of the encryption keys provides access to the entire data set. Some embodiments provide that at least one of encryption keys provides access to multiple portions in the data set.

Operations may include generating (block 534) multiple hashed encryption keys from the multiple encryption keys using at least one randomly generated salt value. Embodiments may further include distributing (block 536) the hashed encryption keys to respective ones of multiple data users. In some embodiments, each of the data users accesses a different one of the portions of the data set.

Figure 6:
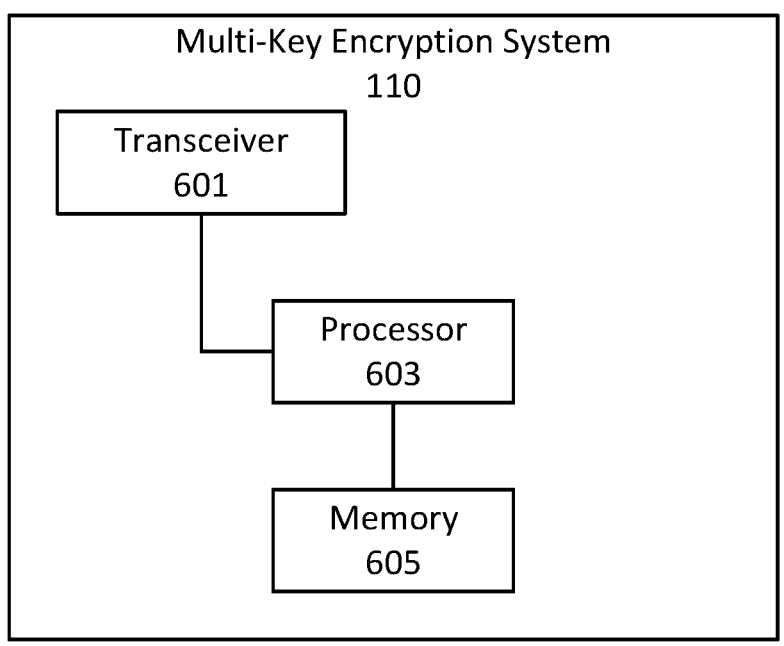
FIG. 6 is a schematic block diagram illustrating a multi-key encryption system in accordance with some embodiments of the present disclosure.

Reference is now made to FIG. 6, which is a schematic block diagram illustrating a multi-key encryption system in accordance with some embodiments of the present disclosure. As shown, system 110 may include transceiver circuit 601 (also referred to as a transceiver) including a transmitter and/or a receiver. The system 110 may also include processor circuit 603 (also referred to as a processor) coupled to the transceiver circuit, and memory circuit 605 (also referred to as memory) coupled to the processor circuit 603. The memory circuit 605 may include computer readable program code that when executed by the processor circuit 603 causes the processor circuit to perform operations according to embodiments disclosed herein. According to other embodiments, processor circuit 603 may be defined to include memory so that separate memory circuit is not required. The system 110 may also include an interface (such as a user interface) coupled with processor circuit 603.

As discussed herein, operations of the system 110 may be performed by processor circuit 603 and/or transceiver circuit 601. Moreover, modules may be stored in memory circuit 605, and these modules may provide instructions so that when instructions of a module are executed by processor circuit 603, processor circuit 603 performs respective operations.

For example, some embodiments provide a system for providing multi-key encryption of the data set in which the processor, performs operations including providing, to a first data user of the data set, a first user specific data point that is defined in a coordinate system that includes at least two dimensions; providing, to a second data user of the data set, a second user specific data point that is defined in the coordinate system; providing, to the first data user and the second data user, at least two shared data points that, when used with either of the first user specific data point or the second user specific data point, define a component polynomial that corresponds to a component that is defined in the data set, that is located on the component polynomial and that is accessible to the first data user and the second data user; providing, to the first data user, a first key share point in the coordinate system that, in combination with the first user specific data point, defines a first data user polynomial that identifies a first encryption key that is on the first data user polynomial at an intercept of a first axis in the coordinate system and that is used by the first data user to decrypt contents of a first portion of the data set; and providing, to the second data user, a second key share point in the coordinate system that, in combination with the second user specific data point, defines a second data user polynomial that identifies a second encryption key that is on the second data user polynomial at an intercept of a first axis in the coordinate system and that is used by the second data user to decrypt contents of a second portion of the data set that is different from the first portion of the data set.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of embodiments of the disclosure. As used herein, the singular forms "a", "an" and "the" are intended to include the plural forms as well, unless the context clearly indicates otherwise. It will be further understood that the terms "include," "includes," "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present embodiments has been presented for purposes of illustration and description, but is not intended to be exhaustive or limited to embodiments in the form disclosed. Many modifications and variations will be apparent to those of ordinary skill in the art without departing from the scope and spirit of embodiments.

Although specific embodiments have been illustrated and described herein, those of ordinary skill in the art appreciate that any arrangement which is calculated to achieve the same purpose may be substituted for the specific embodiments shown and that the embodiments have other applications in other environments. This application is intended to cover any adaptations or variations. The following claims are in no way intended to limit the scope of embodiments of the disclosure to the specific embodiments described herein.

What is claimed is:

1. A method for providing multi-key encryption of a data set, the method comprising:
providing, via a processor circuit and to a first data user of the data set, a first user specific data point that is defined in a coordinate system that includes at least two dimensions;
providing, via the processor circuit and to a second data user of the data set, a second user specific data point that is defined in the coordinate system;
providing, via the processor circuit and to the first data user and the second data user, at least two shared data points that, when used with either of the first user specific data point or the second user specific data point, define a component polynomial that corresponds to a component that is defined in the data set, that is located on the component polynomial and that is accessible to the first data user and the second data user; and
providing, via the processor circuit and to the first data user, a first key share point in the coordinate system that, in combination with the first user specific data point, defines a first data user polynomial that identifies a first encryption key that is on the first data user polynomial at an intercept of a first axis in the coordinate system and that is used by the first data user to decrypt contents of a first portion of the data set,
wherein the data set comprises a manufacturing data set provided by an integrator corresponding to an assembly that includes a plurality of parts,
wherein the first portion of the data set comprises first part data corresponding to a first part of the plurality of parts,
wherein a second portion of the data set comprises second part data corresponding to a second part of the plurality of parts,
wherein the first data user comprises a first supplier that supplies the first part to the integrator based on access to the first part data using the first encryption key, and
wherein the second data user comprises a second supplier that supplies the second part to the integrator based on access to the second part data using a second encryption key.

2. The method of claim 1, further comprising providing, via the processor circuit and to the second data user, a second key share point in the coordinate system that, in combination with the second user specific data point, defines a second data user polynomial that identifies the second encryption key that is on the second data user polynomial at an intercept of a first axis in the coordinate system and that is used by the second data user to decrypt contents of the second portion of the data set that is different from the first portion of the data set.

3. The method of claim 2, wherein the first portion of the data set and the second portion of the data set comprise partially overlapping portions that are common to both the first and second portions.

4. The method of claim 2 wherein the first portion includes all of the second portion and other data in the data set.

5. The method of claim 1, further comprising, before providing the first user specific data point that is defined in a coordinate system that includes at least two dimensions, determining maximum number of data users and determining a degree of the component polynomial.

6. The method of claim 1, further comprising generating a plurality of user specific keys that are used to encrypt and decrypt portions of the data set, wherein each of the portions is exclusively accessible to a corresponding one of a plurality of data users.

7. The method of claim 6, further comprising distributing the plurality of user specific keys that are used to encrypt and decrypt portions of the data set to respective ones of the plurality of data users.

8. The method of claim 6, wherein distributing the plurality of user specific keys comprises, for each of the plurality of user specific keys, hashing the user specific key based a salt that includes a randomly generated value and including information for extracting the user specific key from a hash value.

9. The method of claim 1, wherein the coordinate system comprises a Galois field, and wherein the at least two dimensions are orthogonal to one another.

10. The method of claim 9, wherein the second part data includes data that is included in the first part data.

11. The method of claim 9, wherein the first part data is modified to include additional data after the first supplier receives the first encryption key, wherein the first part data and the additional data are accessible using the first encryption key.

12. The method of claim 9, wherein the first data and the second data are mutually exclusive from one another.

13. The method of claim 1, wherein the data set comprises a single encrypted file, and wherein the first encryption key is used to access a portion of the single encrypted file that corresponds to the first portion of the data set.

14. A method for providing multi-key encryption of a data set, the method comprising:
generating a plurality of encryption keys that are used to decrypt a plurality of portions of the data set that correspond to respective ones of the plurality of encryption keys, wherein generating the plurality of encryption keys comprises providing to a first data user a first key share point in a coordinate system that, in combination with a first user specific data point, defines a first data user polynomial that identifies a first encryption key that is on a first data user polynomial at an intercept of a first axis in a coordinate system and that is used by the first data user to decrypt contents of a first portion of the data set;
generating a plurality of hashed encryption keys from the plurality of encryption keys using at least one randomly generated salt value; and
distributing the plurality of hashed encryption keys to respective ones of a plurality of data users, wherein each of the plurality of data users accesses a different one of the plurality of portions of the data set,
wherein the data set comprises a manufacturing data set provided by an integrator corresponding to an assembly that includes a plurality of parts,
wherein a first portion of the data set comprises first part data corresponding to a first part of the plurality of parts,
wherein a second portion of the data set comprises second part data corresponding to a second part of the plurality of parts,
wherein the first data user comprises a first supplier that supplies the first part to the integrator based on access to the first part data using a first hashed encryption key of the plurality of hashed encryption keys, and
wherein a second data user comprises a second supplier that supplies the second part to the integrator based on access to the second part data using a second hashed encryption key of the plurality of hashed encryption keys.

15. The method of claim 14, wherein the plurality of encryption keys is persistent relative to changes in corresponding ones of the plurality of portions.

16. The method of claim 14, wherein generating the plurality of encryption keys comprises:
generating a plurality of points that are used to define a polynomial in the coordinate system that includes at least two dimensions; and
determining values of the plurality of encryption keys based on an axis intercept of the polynomial.

17. The method of claim 16, wherein at least one of the plurality of encryption keys provides access to all of the data set.

18. The method of claim 16, wherein at least one of the plurality of encryption keys provides access to a plurality of portions in the data set.

19. A system for providing multi-key encryption of a data set, the system comprising:
a processor circuit;
a memory circuit associated with the processor circuit, the memory circuit comprising computer readable program instructions that, when executed by the processor circuit, cause the processor circuit to perform a set of functions comprising:
providing, to a first data user of the data set, a first user specific data point that is defined in a coordinate system that includes at least two dimensions;
providing, to a second data user of the data set, a second user specific data point that is defined in the coordinate system;
providing, to the first data user and the second data user, at least two shared data points that, when used with either of the first user specific data point or the second user specific data point, define a component polynomial that corresponds to a component that is defined in the data set, that is located on the component polynomial and that is accessible to the first data user and the second data user;
providing, to the first data user, a first key share point in the coordinate system that, in combination with the first user specific data point, defines a first data user polynomial that identifies a first encryption key that is on the first data user polynomial at an intercept of a first axis in the coordinate system and that is used by the first data user to decrypt contents of a first portion of the data set; and
providing, to the second data user, a second key share point in the coordinate system that, in combination with the second user specific data point, defines a second data user polynomial that identifies a second encryption key that is on the second data user polynomial at an intercept of a first axis in the coordinate system and that is used by the second data user to decrypt contents of a second portion of the data set that is different from the first portion of the data set,
wherein the data set comprises a manufacturing data set provided by an integrator corresponding to an assembly that includes a plurality of parts,
wherein the first portion of the data set comprises first part data corresponding to a first part of the plurality of parts,
wherein a second portion of the data set comprises second part data corresponding to a second part of the plurality of parts,
wherein the first data user comprises a first supplier that supplies the first part to the integrator based on access to the first part data using the first encryption key, and
wherein the second data user comprises a second supplier that supplies the second part to the integrator based on access to the second part data using a second encryption key.

20. The system of claim 19, wherein the set of functions further comprises providing, via the processor circuit and to the second data user, a second key share point in the coordinate system that, in combination with the second user specific data point, defines a second data user polynomial that identifies the second encryption key that is on the second data user polynomial at an intercept of a first axis in the coordinate system and that is used by the second data user to decrypt contents of the second portion of the data set that is different from the first portion of the data set.

* * * * *